(12) United States Patent
Miyata et al.

(10) Patent No.: US 7,364,522 B2
(45) Date of Patent: Apr. 29, 2008

(54) PULLEY FOR POWER TRANSMISSION BELT AND BELT POWER TRANSMISSION DEVICE

(75) Inventors: Hirofumi Miyata, Hyogo (JP); Shinichiro Nishikawa, Hyogo (JP)

(73) Assignee: Bando Chemical Industries, Ltd., Hyogo (JP)

( * ) Notice: Subject to any disclaimer, the term of this patent is extended or adjusted under 35 U.S.C. 154(b) by 603 days.

(21) Appl. No.: 10/875,296

(22) Filed: Jun. 25, 2004

(65) Prior Publication Data

US 2005/0009657 A1    Jan. 13, 2005

(30) Foreign Application Priority Data

Jul. 10, 2003  (JP) .............................. 2003-272923

(51) Int. Cl.
*F16H 7/20* (2006.01)
*F16H 55/12* (2006.01)
*F16H 55/32* (2006.01)

(52) U.S. Cl. ...................... 474/199; 474/135; 474/165; 474/151

(58) Field of Classification Search ........ 474/133–135, 474/114, 117, 168, 199, 902, 903, 151; 384/192, 384/417, 498; 403/112; 254/398, 393; 464/122, 464/145

See application file for complete search history.

(56) References Cited

U.S. PATENT DOCUMENTS

| 2,279,887 | A | * | 4/1942 | Hathorn ...................... 474/168 |
| 2,421,685 | A | * | 6/1947 | Crot et al. .................. 384/498 |
| 4,372,435 | A | * | 2/1983 | Bradbury .................... 464/122 |
| 4,610,645 | A | * | 9/1986 | Donn et al. ................. 474/199 |
| 4,610,646 | A | * | 9/1986 | Walter et al. ............... 474/199 |
| 4,747,810 | A | * | 5/1988 | Shepley et al. ............. 474/135 |
| 6,125,712 | A | * | 10/2000 | Kaburagi et al. ........... 474/903 |
| 6,811,506 | B2 | * | 11/2004 | Prior et al. ................. 474/199 |

FOREIGN PATENT DOCUMENTS

| DE | CH 641395 A5 | * | 2/1984 |
| JP | 56-88013 A | * | 7/1981 |
| JP | 06-307521 | | 11/1994 |
| JP | 06-307521 A | | 11/1994 |

* cited by examiner

*Primary Examiner*—Marcus Charles
(74) *Attorney, Agent, or Firm*—Donald R. Studebaker; Nixon Peabody LLP

(57) ABSTRACT

A pulley body 5 is provided at its both sides with power transmission members 6, 6. When a flat belt 3 becomes misaligned relative to the center of the pulley body 5 and comes into contact with one of the power transmission members 6, a running force of the flat belt 3 is utilized to displace the pulley body 5 diagonally relative to the flat belt 3, thus producing a force for returning the flat belt 3 to its original state.

4 Claims, 5 Drawing Sheets

PULLEY FOR POWER TRANSMISSION BELT AND BELT POWER TRANSMISSION DEVICE

BACKGROUND OF THE INVENTION (1) Field of the Invention

The present invention relates to pulleys for power transmission belts, and belt power transmission devices.

(2) Background Art

In a power transmission device that uses a flat belt, the flat belt might zigzag during running, or might cause side tracking toward one side of a pulley. This is because, compared with other power transmission belts, a flat belt is susceptible to changes in components of a power transmission device, such as deviation of a pulley shaft from its proper position, deflection of the pulley shaft caused by a variation in shaft load, and wobbling of a pulley. If such zigzagging or side tracking occurs, a flat belt comes into contact with a flange of a flat pulley to scuff a side face of the flat belt or fray a cord.

As the measures to prevent such a problem, in a known power transmission device, a crown (i.e., a crowned curved surface) is formed at a periphery of a flat pulley. However, if importance is attached to the stability of running of the flat belt (i.e., prevention of zigzagging or side tracking) to reduce the radius of curvature of the crown, stresses are concentrated at the center of the belt width. Thus, the entire belt width cannot be effectively utilized for power transmission, which leads to early fatigue of a cord and degradation in power transmission capability.

To cope with this, in another known power transmission device, a large number of grooves are formed at a periphery of a flat pulley so as to be spaced apart in a circumferential direction (e.g., see Japanese Unexamined Patent Publication No. 6-307521). Specifically, these grooves are extended symmetrically from the center of width of the pulley to both sides so as to be V-shaped, and a friction that pulls a flat belt to the center is produced between the flat belt and the pulley, thus preventing zigzagging and/or side tracking of the belt.

However, if the above-described grooves are formed at a flat pulley, the fabrication cost of the flat pulley is increased, and furthermore, it is difficult to certainly prevent zigzagging and/or side tracking of the flat belt by merely forming these grooves. Therefore, the fact is that a flat belt power transmission device is not sufficiently utilized although it does not cause great loss resulting from bending of the belt and has considerably high power transmission efficiency as compared with other belts such as V-belts.

SUMMARY OF THE INVENTION

The present invention has been made in view of the above problems and its object is to enable effective use of a belt power transmission device in various industrial equipment or other equipment by certainly preventing zigzagging and/or side tracking of a flat belt and other power transmission belts.

In order to achieve the above object, in the present invention, a pulley used for adjustment of the length and contact angle of a power transmission belt, application of tension, and change in belt-running direction, for example, is provided with the function of preventing zigzagging/side tracking of the belt.

Specifically, a pulley according to the present invention includes: a pulley body around which a power transmission belt is wound; a shaft member for rotatably supporting the pulley body; supporting means for swingably supporting the shaft member to incline the pulley body diagonally right and left relative to the power transmission belt; and power transmission members located at both sides of the pulley body. When the power transmission belt that has become misaligned relative to the pulley body comes into contact with one of the power transmission members, the power transmission member transmits a motive force of the power transmission belt to the shaft member so that the pulley body is inclined opposite to the direction of misalignment of the power transmission belt to assume a diagonal position relative to the power transmission belt.

In this pulley, when the power transmission belt becomes misaligned relative to the widthwise center of the pulley body and comes into contact with one of the power transmission members, the motive force (running force) of the power transmission belt is applied to the power transmission member, and thus a swinging force is applied to the shaft member via this power transmission member. Therefore, the shaft member is inclined, and the pulley body is rotated while it is inclined opposite to the direction of misalignment of the power transmission belt to assume a diagonal position relative to the power transmission belt. As a result, a force for returning the power transmission belt to the widthwise center of the pulley body is applied to the power transmission belt.

It is preferable that the power transmission members at both sides of the pulley body are provided at the shaft member, and each include a belt contact surface flush with a surface of the pulley body around which the belt is wound.

Therefore, when the power transmission belt becomes misaligned relative to the pulley body, an inner face (working flank) or an outer face (back face) of the power transmission belt comes into contact with the belt contact surface of the power transmission member, thus preventing the wearing away and scuffing of a side face of the power transmission belt, or preventing a cord from being frayed.

Further, it is preferable that: the shaft member is formed into a tubular shape; the supporting means includes a supporting rod inserted into the tubular shaft member, and a pin for swingably supporting the tubular shaft member relative to the supporting rod; and the pin is located in the vicinity of the widthwise center of the pulley body and is extended orthogonally to the axial center of the pulley body.

Accordingly, the center of swinging of the pulley body is located in the vicinity of the widthwise center of the pulley body, which is advantageous in increasing the angle of swinging to immediately eliminate zigzagging/side tracking of the power transmission belt, and is also advantageous in reducing the size of the pulley.

It is further preferable that: the tubular shaft member and the supporting rod have flat surfaces for receiving tension of the power transmission belt, wound around the pulley body, to slidably come into contact with each other; and the pin is provided to extend perpendicularly to the flat surfaces.

In such an embodiment, since the tubular shaft member and the supporting rod are slidably in contact with each other due to tension of the power transmission belt, a swinging resistance is exerted on the tubular shaft member due to this contact. Thus, it is possible to prevent an accidental swinging of the pulley body caused, for example, by wobbling of the power transmission belt during running, or it is possible to prevent the occurrence of hunting in which lateral jitter of the pulley body is caused.

Besides, the present invention provides a belt power transmission device in which the above-described pulley is pressed against a power transmission belt to apply tension thereto.

Therefore, it is possible to prevent zigzagging/side tracking of the power transmission belt while applying stable tension to the power transmission belt, which is advantageous in sufficiently achieving the power transmission capability of the power transmission belt.

As the power transmission belt, any belt such as a flat belt or a synchronous belt (timing belt) may be used. In the case of a flat belt, an inner face (working flank) or an outer face (back face) of the flat belt may come into contact with the pulley body. On the other hand, in the case of a synchronous belt, an outer face (back face) of the synchronous belt preferably comes into contact with the pulley body.

As described above, according to the present invention, the shaft member for rotatably supporting the pulley body, around which the power transmission belt is wound, is swingably provided, and the power transmission members are located at both sides of the pulley body. When the power transmission belt comes into contact with one of the power transmission members, the power transmission member transmits a motive force of the power transmission belt to the shaft member so that the pulley body is inclined opposite to the direction of misalignment of the power transmission belt to assume a diagonal position relative to the power transmission belt. Therefore, when the power transmission belt becomes misaligned toward one side from the widthwise center of the pulley body to come into contact with one of the power transmission members, the pulley body assumes a diagonal position relative to the power transmission belt. Thus, a force for returning the power transmission belt to the widthwise center of the pulley body is applied to the power transmission belt, thus making it possible to immediately eliminate zigzagging and/or side tracking of the power transmission belt with certainty.

Accordingly, the crowning height of a flat pulley can be reduced; furthermore, a flat pulley provided with no crown may be used, which facilitates the design of the pulley. In addition, the distribution of tension applied to a cord of the power transmission belt can be equally stabilized, which is advantageous in improving the durability and power transmission capability of the power transmission belt.

Further, according to the present invention, when the power transmission belt becomes misaligned relative to the pulley body, the inner face (working flank) or the outer face (back face) of the power transmission belt comes into contact with the belt contact surface of the power transmission member. Thus, it becomes possible to avoid the wearing away and scuffing of a side face of the power transmission belt, or the fray of a cord, which is advantageous in improving the durability of the power transmission belt.

Furthermore, according to the present invention, the shaft member is formed into a tubular shape, the supporting rod is inserted into the tubular shaft member, and the tubular shaft member is swingably supported relative to the supporting rod by using the pin in the vicinity of the widthwise center of the pulley body. This is advantageous in increasing the swinging angle to immediately eliminate zigzagging/side tracking of the power transmission belt, and is also advantageous in reducing the size of the pulley.

Moreover, according to the present invention, the tubular shaft member and the supporting rod have the flat surfaces for receiving tension of the power transmission belt, wound around the pulley body, to slidably come into contact with each other, and the pin is provided to extend perpendicularly to the flat surfaces. Thus, the tension of the power transmission belt can cause a swinging resistance to the tubular shaft member. This is advantageous in preventing an accidental swinging of the pulley body and the occurrence of hunting in which lateral jitter of the pulley body is caused.

Besides, in the belt power transmission device in which the above-described inventive pulley is pressed against a power transmission belt to apply tension thereto, it is possible to prevent zigzagging and/or side tracking of the power transmission belt while applying stable tension to the power transmission belt, which is advantageous in sufficiently achieving the power transmission capability of the power transmission belt.

DESCRIPTION OF THE PREFERRED EMBODIMENTS

Hereinafter, an embodiment of the present invention will be described in detail with reference to the drawings.

Figure 1:
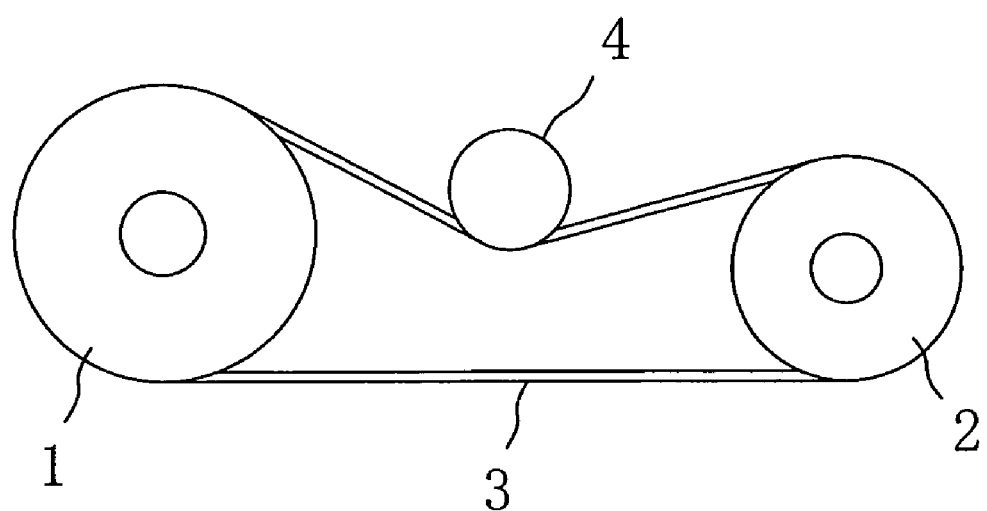
FIG. 1 is a side view of a belt power transmission device according to the present invention.

FIG. 1 shows a belt power transmission device according to the embodiment of the present invention. As shown in FIG. 1, the belt power transmission device includes: a driving pulley 1 (flat pulley); a driven pulley 2 (flat pulley); a flat belt 3 wound around both the pulleys 1 and 2; and a pulley 4 pressed against the flat belt 3.

Figure 2:
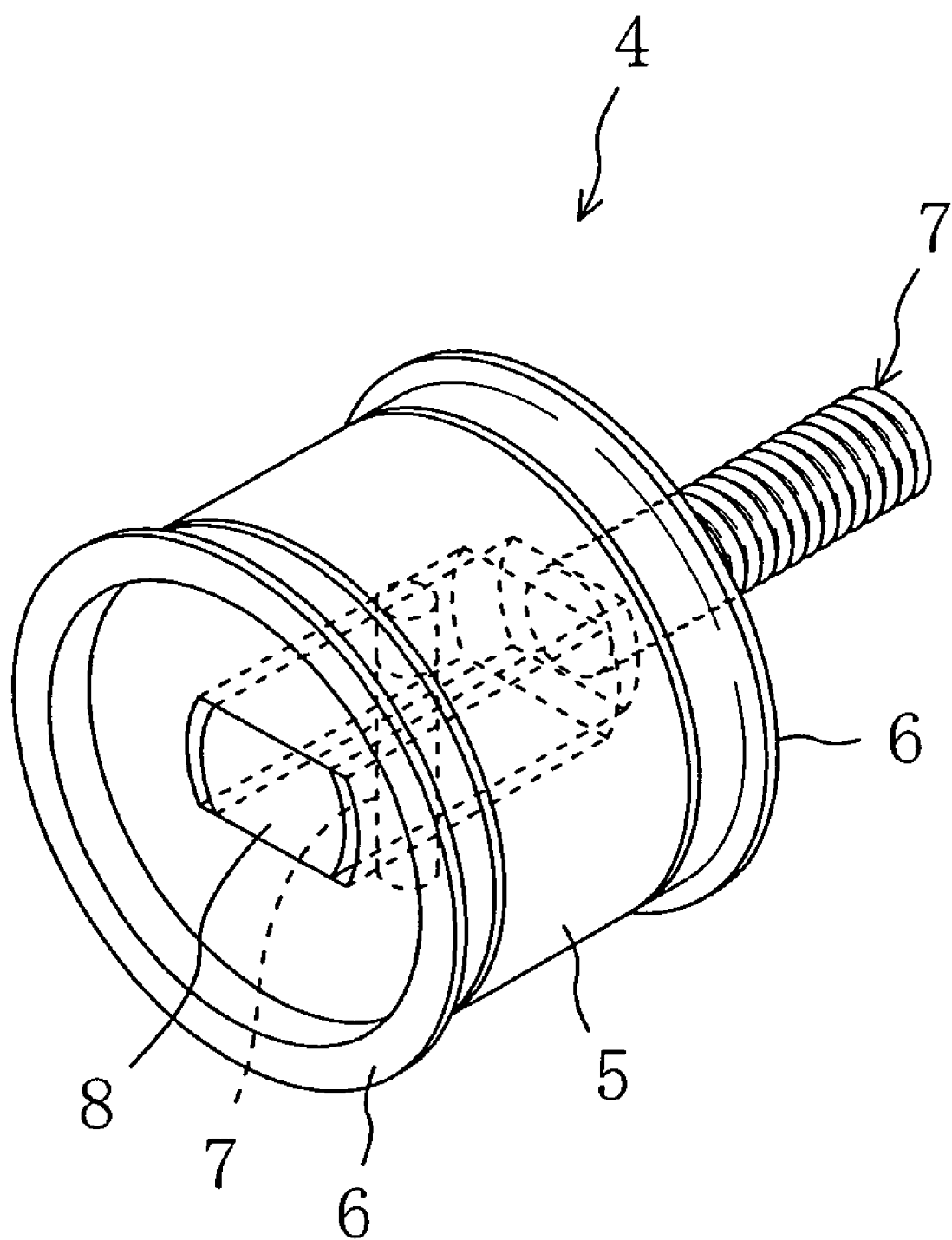
FIG. 2 is an oblique view of a pulley according to the present invention.

As shown in FIG. 2, the pulley 4 includes: a pulley body 5 around which the flat belt 3 is wound; power transmission members 6, 6 located at both sides of the pulley body 5; and a supporting means 7 for swingably supporting the pulley body 5 and the power transmission members 6, 6. The supporting means 7 includes a supporting rod 8 and a pin 9.

Figure 3:
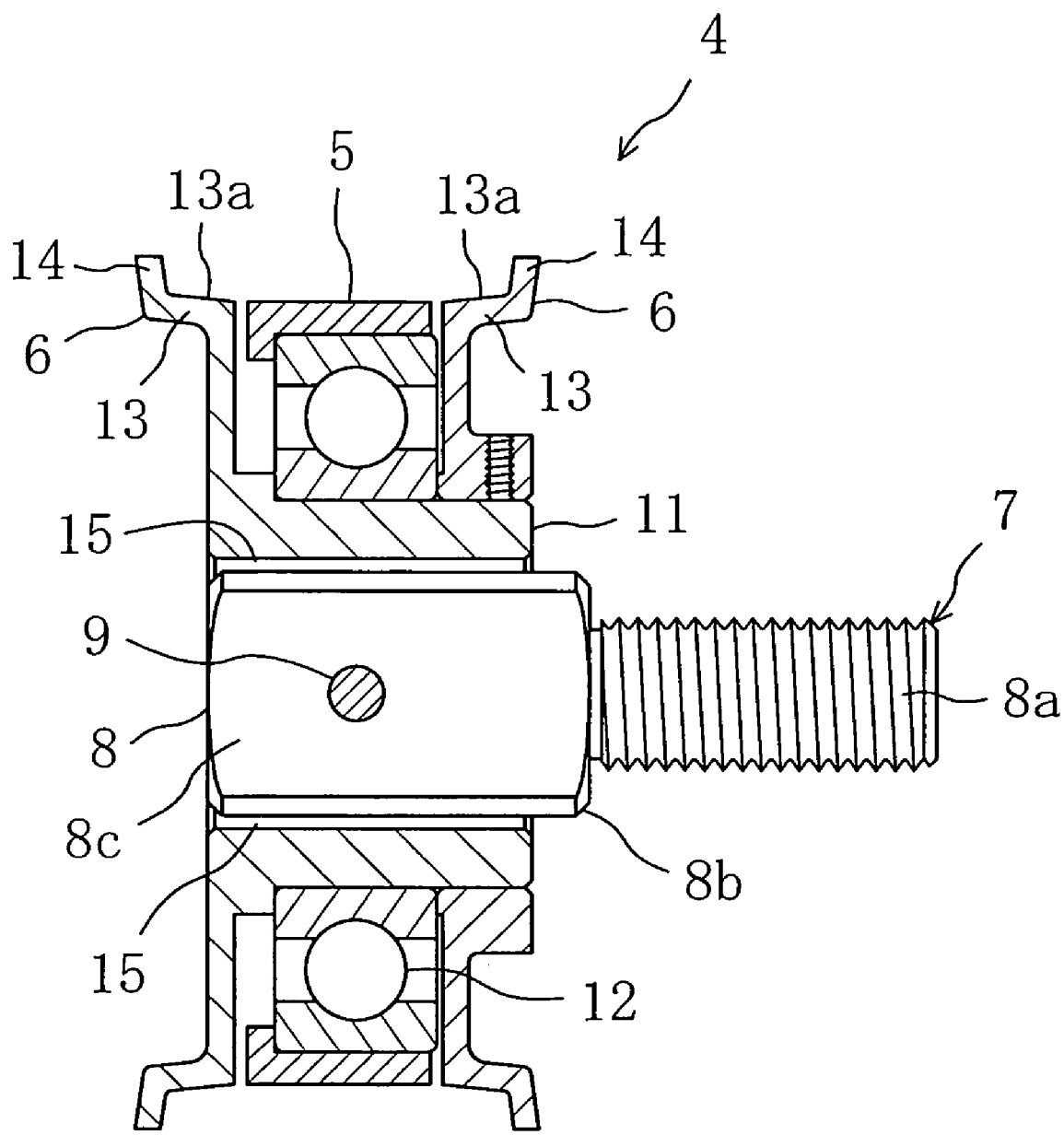
FIG. 3 is a cross-sectional view of the pulley.

As shown in FIG. 3, the pulley body 5 is rotatably supported to a tubular shaft member 11 via a bearing 12. One of the power transmission members 6 is formed integrally with the shaft member 11, and is projected in a collar-like manner in a centrifugal direction from one end of the shaft member 11. The other power transmission member 6 is connected to the other end of the shaft member 11, and is projected in a collar-like manner in a centrifugal direction from the other end of the shaft member 11.

The power transmission members 6, 6 are provided at rims thereof tubular belt-receiving portions 13, 13, and the belt-receiving portions 13, 13 are provided at outer edges thereof with collars 14, 14 each projected in a centrifugal direction. Each belt-receiving portion 13 includes a belt contact surface 13a flush with a surface of the pulley body 5 at which the belt is wound. Each belt contact surface 13a is inclined such that a region thereof separated from the pulley body 5 is located higher than the belt-wound surface of the pulley body 5 in a centrifugal direction.

Figure 4:
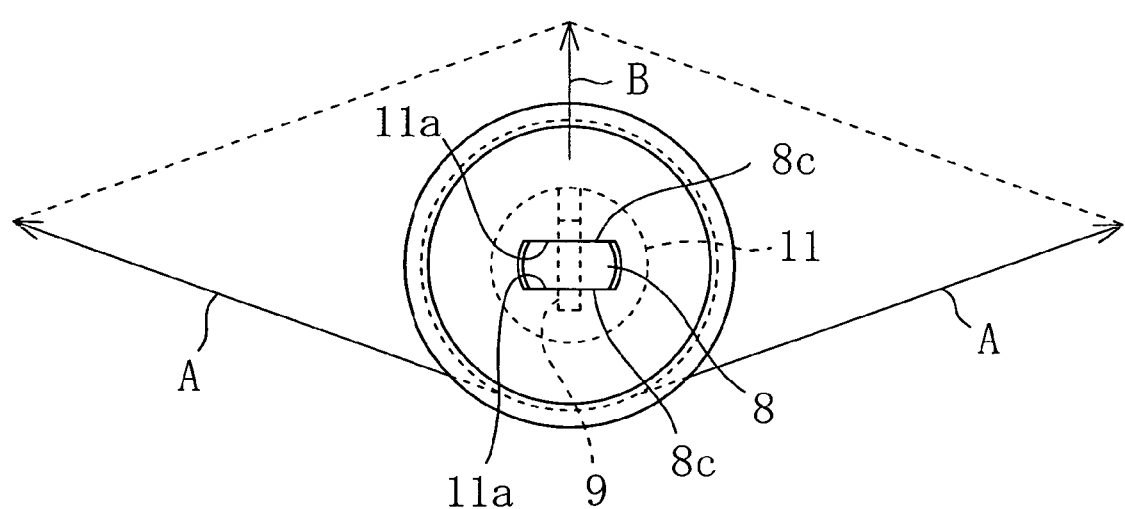
FIG. 4 is a diagram illustrating the relationship between the pulley and belt tension.

The supporting rod 8 includes: an attachment portion (screw portion) 8a screwed to a support body such as a housing provided with the belt power transmission device, or screwed to a bracket extended from the support body; and a supporting portion 8b provided continuously from one end of the attachment portion 8a and inserted into a tubular hole of the tubular shaft member 11. The supporting portion 8b is formed by cutting away radially corresponding D-shaped portions of the rod having a circular cross section and a diameter larger than that of the attachment portion 8a. Since the D-shaped portions are cut away, flat sliding surfaces 8c, 8c extended in parallel with each other are formed at the supporting portion 8b as shown in FIG. 4.

Therefore, the supporting portion 8b includes: the flat sliding surfaces 8c, 8c corresponding to each other; and arc-shaped surfaces located at both sides of the supporting portion 8b to connect lateral edges of these sliding surfaces 8c, 8c to each other, and the supporting portion 8b is formed into a substantially oblong shape in cross section.

On the other hand, the tubular hole of the tubular shaft member 11 is formed into a substantially oblong shape in cross section so as to correspond to the cross-sectional shape of the supporting portion 8b of the supporting rod 8. That is, at an inner face of the tubular shaft member 11, flat sliding surfaces 11a, 11a are formed so as to face each other, and the sliding surfaces 8c, 8c of the supporting rod 8 slidably come into contact with the sliding surfaces 11a, 11a. Furthermore, at the inner face of the tubular shaft member 11, arc-shaped surfaces are formed at both sides to connect lateral edges of these sliding surfaces 11a, 11a.

The pin 9 of the supporting means 7 is fitted into a through hole formed in the supporting portion 8b of the supporting rod 8, and both ends of the pin 9 are fitted into supporting holes formed in the tubular shaft member 11. The through hole of the supporting rod 8 is formed to extend in a direction orthogonal to the sliding surfaces 8c in the vicinity of the center of the width of the pulley body 5. In other words, the pin 9 is located in the vicinity of the center of the width of the pulley body 5 and is orthogonal to the sliding surfaces 8c of the supporting rod 8.

Gaps 15, 15 are formed between the arc-shaped surfaces at both the sides of the supporting portion 8b of the supporting rod 8, and the arc-shaped surfaces at both the sides of the tubular hole of the tubular shaft member 11, and thus the gaps 15, 15 allow the tubular shaft member 11 to be swung on the pin 9.

Hereinafter, an exemplary usage and functions of the pulley 4 will be described. As shown in FIG. 1, in the present embodiment, the pulley 4 is pressed against the back face of the flat belt 3 and tension is thus applied to the flat belt 3 in order to use the pulley 4 as a tension pulley. As shown in FIG. 4, the pulley 4 is provided such that a reaction force produced when tension is applied to the flat belt 3, i.e., a resultant force B of belt tensions A, A, is exerted in a direction substantially orthogonal to the surfaces of the supporting rod 8 from which the D-shaped portions have been cut away, i.e., the sliding surfaces 8c of the supporting rod 8.

Figure 5:
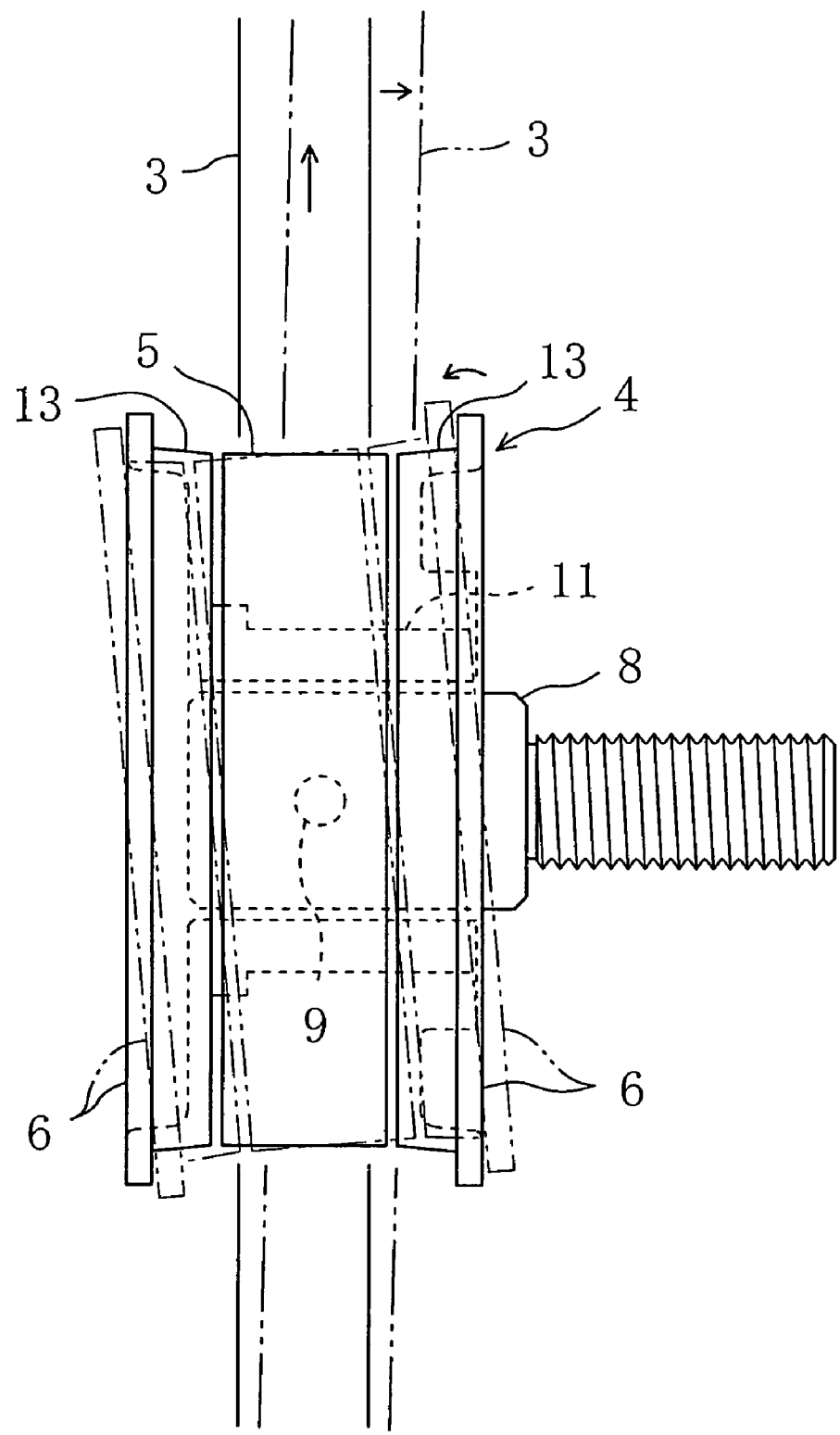
FIG. 5 is a plan view illustrating motion of the pulley.

In this usage, as shown in FIG. 5, if the flat belt 3, wound around the pulley body 5 in the vicinity of the widthwise center thereof, becomes misaligned relative to the center of the pulley body 5 as indicated by the associated chain double-dashed lines, and then comes into contact with the belt-receiving portion 13 of one of the power transmission members 6, a front side portion of this power transmission member 6 in the belt-running direction is pulled inward by the flat belt 3. Thus, the pulley body 5 is immediately swung on (or rotated and displaced around) the shaft member 11 and the pin 9, and the pulley body 5 rotates while inclining opposite to the direction of misalignment of the flat belt 3 to assume a diagonal position relative to the flat belt 3 as indicated by the associated chain double-dashed lines.

Accordingly, since the pulley body 5 rotates while assuming the diagonal position, a force for returning the flat belt 3 to the center of the pulley body 5 is exerted on the flat belt 3. If the flat belt 3 has been returned, the pulley body 5 receives a rotational power from the flat belt 3 in the belt-running direction; therefore, the pulley body 5 is rotated and displaced around the pin 9 in the direction opposite to the previous swinging, and is thus retuned to its original state, i.e., the state in which the pulley body 5 is orthogonal to the supporting rod 8. The same holds true for the case where the flat belt 3 becomes misaligned relative to the vicinity of the widthwise center of the pulley body 5 and toward the opposite power transmission member 6.

As described above, if the flat belt 3 becomes misaligned relative to the pulley body 5, the pulley body 5 is immediately swung to return the flat belt 3 to its original position, thus substantially eliminating the possibility of zigzagging or side tracking of the flat belt 3.

Further, from the flat belt 3, a reaction force is vertically acted upon the sliding surfaces 8c and 11a of the supporting rod 8 and the tubular shaft member 11, and therefore, appropriate resistance is exerted on both the sliding surfaces 8c and 11a. Thus, when the flat belt 3 runs in the vicinity of the center of the pulley body 5, it becomes possible to avoid the situation in which a slight swinging of the pulley body 5 is caused, for example, by wobbling of the flat belt 3 during running.

Furthermore, when the flat belt 3 has become misaligned relative to the pulley body 5, only the back face of the flat belt 3 which is highly resistant to wear comes into contact with the belt contact surface 13a of the power transmission member 6, and therefore, a rip is prevented from being caused at a side face of the flat belt 3. Consequently, it becomes unnecessary to carry out special processing for preventing a side face of the flat belt 3 from being ripped and/or a cord from being frayed, which is advantageous in reducing the fabrication cost of the flat belt.

Besides, even if an abnormal external force that makes the flat belt 3 considerably misaligned relative to the pulley body 5 is exerted on the flat belt 3, the flat belt 3 abuts against the collar 14 of the power transmission member 6, thus preventing the flat belt 3 from falling off the pulley 4.

If the pulley 4 is used as a tension pulley as described in the present embodiment, stable tension can be applied to the flat belt 3, which is advantageous in sufficiently achieving the power transmission capability of the flat belt 3.

In the present embodiment, the belt-receiving portion 13 of each power transmission member 6 is formed into a tubular shape. Alternatively, only a part of the belt-receiving portion 13 adjacent to the pulley body 5, around which the flat belt 3 is wound, may be formed into an arc-shape.

If each belt-receiving portion 13 is formed into a tubular shape as described in the present embodiment, each power transmission member 6 is rotationally provided to the shaft member 11, and the power transmission member 6 is rotated when the flat belt 3 comes into contact with the power transmission member 6. This is advantageous in minimizing the wearing away of the flat belt 3. In this case, a rotational resistance of the power transmission member 6 is made greater than that of the pulley body 5 such that a belt-running force is partially converted into a force for swinging the pulley body 5, when the flat belt 3 comes into contact with the power transmission member 6.

In order to increase the rotational resistance of each power transmission member, the following provisions may be made, for example. A power generation means that utilizes the rotation of the power transmission member for power generation is provided to produce rotational resistance, the power transmission member is provided with a permanent magnet to produce rotational resistance by using a magnetic force, or the power transmission member is provided with fins to convert the resulting rotational power into wind power, thus producing rotational resistance.

In addition, although the pulley 4 is used as a tension pulley in the present embodiment, the pulley 4 may also be used for other purposes in the power transmission device. For example, the pulley 4 may be used to adjust the length of the flat belt, to adjust the angle of contact of the flat belt, and/or to change the belt-running direction.

Moreover, the supporting means 7 for swingably supporting the shaft member 11 is not limited to one described in the present embodiment, but various mechanisms may alternatively be adopted. For example, links may be connected to both ends of the shaft member to form a parallel link mechanism for parallelly displacing both the links, thus allowing the swinging of the shaft member 11. Optionally, the shaft member may be provided at its both ends with biasing means for biasing the shaft member forward and backward in the belt-running direction such that the shaft member assumes a neutral position (i.e., a position orthogonal to the belt-running direction), and one end of the shaft member is moved against the biasing forces applied by the biasing means, thus allowing the swinging of the shaft member 11.

What is claimed is:

1. A pulley for a belt power transmission device, the pulley comprising:

a pulley body around which a power transmission belt is wound;

a shaft member for rotatably supporting the pulley body;

supporting means for swingably supporting the shaft member to incline the pulley body diagonally right and left relative to the power transmission belt; and power transmission members located at both sides of the pulley body to transmit a motive force of the power transmission belt to the shaft member, wherein when the power transmission belt that has become misaligned relative to the pulley body and comes into contact with one of the power transmission members, the pulley body is inclined opposite to the direction of misalignment of the power transmission belt to assume a diagonal position relative to the power transmission belt, wherein the power transmission members are provided at the shaft member, and wherein the power transmission members each have a belt contact surface flush with a surface of the pulley body around which the belt is wound.

2. A belt power transmission device in which the pulley of claim 1 is pressed against a the power transmission belt to apply tension thereto.

3. A pulley for a belt power transmission device, the pulley comprising:

a pulley body around which a power transmission belt is wound;

a shaft member for rotatably supporting the pulley body;

supporting means for swingably supporting the shaft member to incline the pulley body diagonally right and left relative to the power transmission belt; and power transmission members located at both sides of the pulley body to transmit a motive force of the power transmission belt to the shaft member, wherein when the power transmission belt that has become misaligned relative to the pulley body and comes into contact with one of the power transmission members, the pulley body is inclined opposite to the direction of misalignment of the power transmission belt to assume a diagonal position relative to the power transmission belt, wherein the shaft member is formed into a tubular shape, wherein the supporting means has: a supporting rod inserted into the tubular shaft member; and a pin for swingably supporting the tubular shaft member relative to the supporting rod, and wherein the pin is located in the vicinity of the widthwise center of the pulley body and is extended orthogonally to the axial center of the pulley body.

4. The pulley of claim 3, wherein the tubular shaft member and the supporting rod have flat surfaces for receiving tension of the power transmission belt, wound around the pulley body, to slidably come into contact with each other, and wherein the pin is provided to extend perpendicularly to the flat surfaces.

* * * * *